United States Patent

Johnson et al.

[11] 3,957,299
[45] May 18, 1976

[54] WEEDING TOOL

[76] Inventors: James P. Johnson; Virgie M. Johnson, both of 214 N. Tonica, Mason City, Ill. 62664

[22] Filed: Feb. 21, 1975

[21] Appl. No.: 551,970

[52] U.S. Cl................................ 294/50.9; 254/132
[51] Int. Cl.² ........................................... A01B 1/16
[58] Field of Search................ 294/19 R, 50.5, 50.6, 294/50.8, 50.9, 99 R, 103; 7/1 L, 14.1 R; 30/315, 318; 172/378; 254/132

[56] References Cited
UNITED STATES PATENTS

| | | | |
|---|---|---|---|
| 1,107,705 | 8/1914 | Ruddy | 254/132 |
| 2,029,155 | 1/1936 | Cervenka et al. | 294/50.9 |
| 2,843,359 | 7/1958 | Franz et al. | 254/132 |
| 3,077,336 | 2/1963 | McClelland | 294/50.9 X |
| 3,157,422 | 11/1964 | Sloan et al. | 294/19 R |
| 3,268,255 | 8/1966 | Bennett | 294/50.9 |
| 3,288,437 | 11/1966 | Pederson | 254/132 |
| 3,608,644 | 9/1971 | Ambrose | 294/50.9 X |
| 3,865,348 | 2/1975 | Close | 254/132 |

*Primary Examiner*—Evon C. Blunk
*Assistant Examiner*—Johnny D. Cherry
*Attorney, Agent, or Firm*—Clarence A. O'Brien; Harvey B. Jacobson

[57] ABSTRACT

An upstanding operating shank including front and rear sides is provided for use in a substantially upright position. The lower end of the shank includes a forwardly and downwardly inclined elongated digging blade which projects outwardly of the front side of the shank. The forward end of the blade includes a sharpened transverse cutting edge and the lower end portion of the shank further includes a rearwardly and outwardly projecting abutment for applying forward foot thrust to the lower end of the shank. An elongated spring-type weed clamping keeper blade is spaced slightly above and generally parallels the digging blade, and the end of the keeper blade adjacent the shank is rigidly supported therefrom while the end of the keeper blade remote in the shank includes an upwardly directed skid portion. In utilizing the weeding tool, the shank is held in a upright position and forward foot pressure is applied to the rearwardly projecting abutment with the cutting blade directed forwardly and downwardly so as to force the forward cutting edge of the blade downwardly into the ground at an angle between 15° and 45° relative to the surface of the ground. As the cutting blade is forced downwardly beneath a weed, the lower root portion of the weed is cut therefrom, the ground through which the upper portion of the weed has been growing is loosened and the upper foliage portion of the weed is clamped between the cutting blade and the weed clamping keeper blade whereby a rearward thrust on the upper end of the shank of the tool will cause the weed and the adjacent soil to be pried out of the ground while the upper portion of the weed is maintained clamped between the cutting blade and the keeper blade.

4 Claims, 5 Drawing Figures

U.S. Patent   May 18, 1976   3,957,299
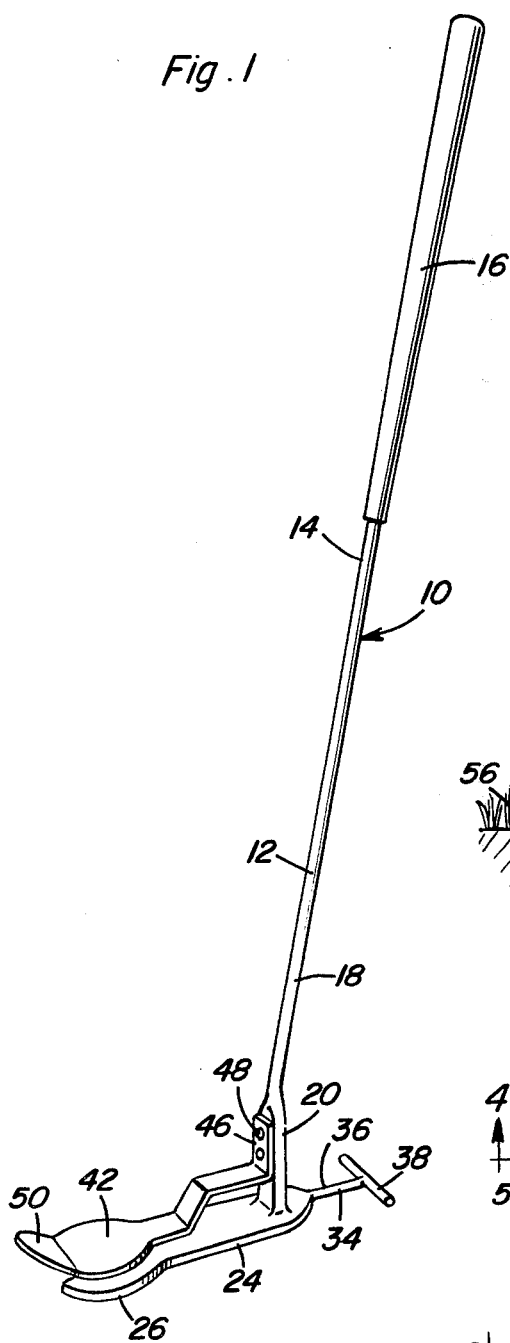
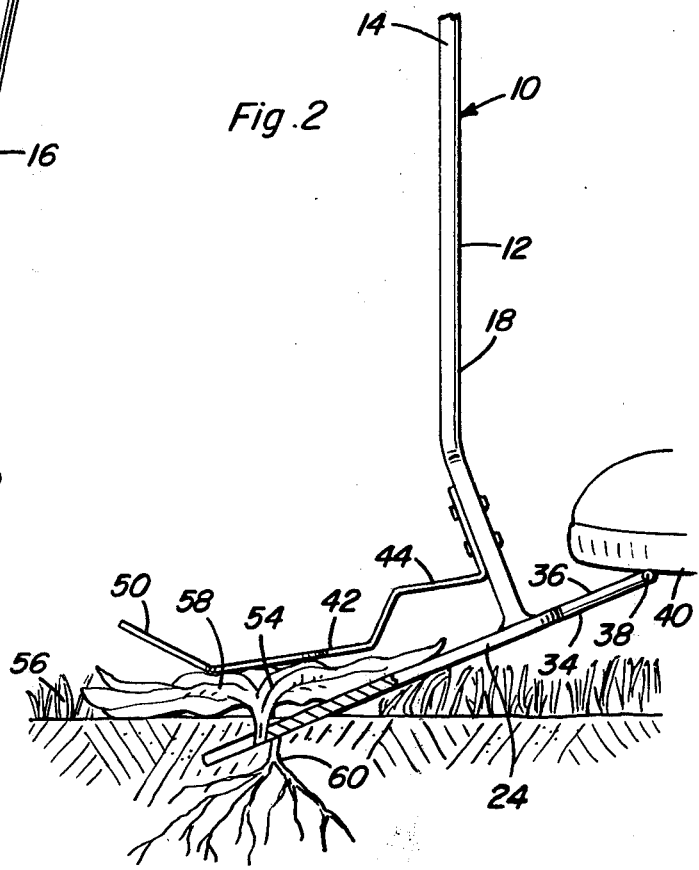
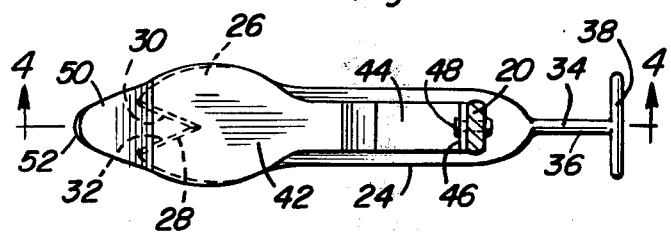
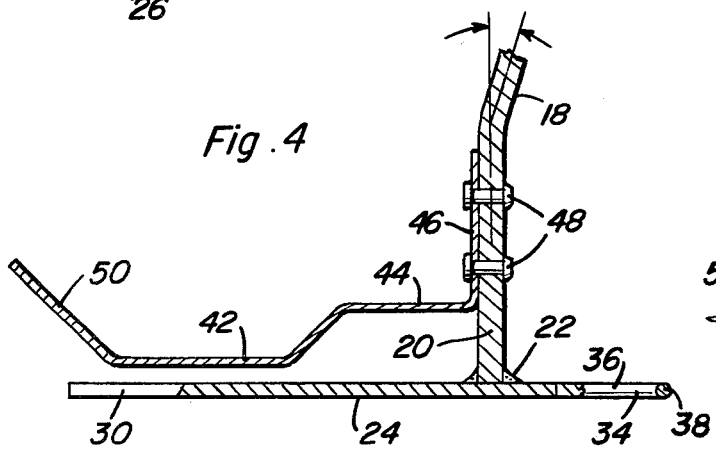
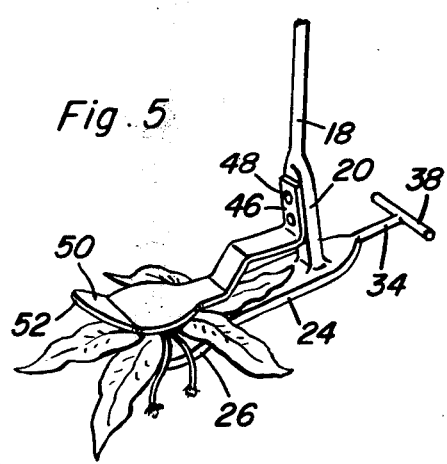

WEEDING TOOL

BACKGROUND OF THE INVENTION

The removal of weeds from lawn areas has been considered as a difficult and tiring task from the time lawns were first weeded. Various types of tools have been heretofore designed to facilitate lawn weeding operations, but most of these previously devised tools have for one reason or another not been 100% effective either in weed removal operations or in the manner in which the tools are designed to be used. Examples of previously patented weeding tools including some of the structural features of the instant invention are disclosed in U.S. Pat. Nos. 1,881,112, 2,000,219, 2,087,128 and 2,273,812.

BRIEF DESCRIPTION OF THE INVENTION

The weeding tool of the instant invention includes an upstanding operating shank of sufficient height to enable use of the tool by the operator while the latter is in an upright standing position. Further, the tool is constructed in a manner whereby it may be guided by the hands of the user and have the necessary force applied thereto for substantially completing the removal of a lawn weed by foot pressure. Thus, the appendages of the body which are most apt in control are utilized in the control of the tool while the appendages of the body having greater strength are utilized to apply the necessary digging force to the tool.

The main object of this invention is to provide a tool which may be utilized to efficiently remove lawn weeds.

Another object of this invention, in accordance with the immediately preceding object is to provide a tool which may be operated while the user is in a comfortable upright position.

Still another object of this invention is to provide a tool in accordance with the preceiding objects and constructed in a manner whereby the necessary forces applied thereto for completing a weed digging operation are exerted through the legs and foot of the user.

A final object of this invention to be specifically enumerated herein is to provide a lawn weeding tool in accordance with the preceding objects and which will conform to conventional forms of manufacture, be of simple construction and easy to use so as to provide a device which will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a weeding tool constructed in accordance with the present invention;

FIG. 2 is a fragmentary side elevational view of the lower portion of the weeding tool illustrated on somewhat of an enlarged scale, with portions thereof being broken away and illustrated in vertical section and with the tool in operation removing a weed from a lawn area;

FIG. 3 is a horizontal sectional view of the lower portion of the weeding tool;

FIG. 4 is an enlarged longitudinal vertical sectional view taken substantially upon the plane indicated by the section line 4—4 of FIG. 3; and FIG. 5 is a fragmentary perspective view illustrating the lower portion of the tool after a lawn weed has been removed thereby and with the lawn weed supported from the tool.

DETAILED DESCRIPTION OF THE INVENTION

Referring now more specifically to the drawings the numeral 10 generally designates the weeding tool of the instant invention. The tool 10 includes an upstanding operating shank 12 having an upper portion 14 equipped with a suitable hand grip 16, an intermediate portion 18 and a slightly angulated lower end portion 20.

The lower end portion 20 is slightly rearwardly angulated relative to the intermediate port 18 at an angle between 15° and 30°.

The lower terminal end of the lower end portion 20 rigidly supports, as by welding 22, a horizontal front to rear extending elongated cutting blade 24 with the lower terminal end portion 20 secured to the cutting blade 24 at a point spaced slightly forwardly of the rear end of the blade 24. The forward end portion of the cutting blade is transversely widened as at 26 and includes a forwardly opening notch 28 including sharpened opposite side marginal portions 30 and 32.

The rear end portion of the cutting blade 24 projects slightly rearwardly of the lower end portion 20 of the operating shank 12 and includes a rearwardly projecting abutment assembly 34 consisting of a rod-like shank 36 extending longitudinally of the blade 24 and having its forward end rigidly secured to the rear end of the blade 24. The rear end of the shank 36 includes a horizontal transverse rod-like cross head 38 against which forward pressure by the user's foot 40 may be applied.

The tool 10 additionally includes a generally horizontal and front to rear extending spring-type weed clamping keeper blade 42 which generally parallels the cutting blade 24, is spaced slightly above the latter and includes an upwardly offset rear end portion 44 terminating in an upwardly directed flange 46 suitably secured, as by rivits 48, to the lower side of the lower end portion 20. The blade 42 includes a forwardly and upwardly directed forward terminal end portion 50 which tapers forwardly to a rounded nose 52 spaced above and forward of the notch 28.

In operation, when it is desired to remove a weed 54 from a lawn area 56, the upper portion 14 of the operating shank 12 is held in a substantially vertical position immediately rearward of the weed 54 and with the forward notched end of the cutting blade 24 disposed closely behind the weed 54. It will be noted that the blade 24 is in a forwardly and downwardly inclined position and while the operator holds the hand grip 16 in one or both hands and stands on one foot he utilized his other foot, as applied to the cross head 38 in the manner illustrated in FIG. 2 of the drawings, to apply a forward and downward thrust to the cutting blade 24 whereby the latter is advanced forwardly and downwardly into the ground beneath the upper foliage portion 58 of the weed 54. In this manner, the sharpened forward notch portion of the cutting blade 24 cuts the upper root portion of the weed 54 from the lower root portion 60 thereof. At this point, the forward and downward thrust applied to the cutting blade 24 by the foot 40 may be released and the upper end portion 14 of the operating shank 12 is swung rearwardly so as to cam the upper cut portion of the weed 54 from the lawn area with the upper foliage portion 58 of the weed 54 clamped between the opposing surfaces of the cutting blade 24 and the blade 42, see FIG. 5. Then, the lower end of the tool 10 may be rapped against the inner side of a suitable receptacle provided to receive the weeds 54 as they are removed from the lawn area 56, or the tool 10 may be elevated in one hand in order that the other hand of the user may be utilized to withdraw the cut portion of the weed from between the blades 24 and 42 prior to manually placing the cut portion of the weed in a suitable receptacle.

Although the weeding tool of the instant invention has been herein described as specifically designed for use in removing lawn weeds, it is to be noted that the tool 10 may also be utilized to dig weeds from other areas and also to remove other plant foliage by cutting the top portions of those plants closely beneath the ground surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, failing within the scope of the invention.

What is claimed as new is as follows:

1. A weeding tool including a generally vertical operating shank including front and rear sides and a lower end portion slightly rearwardly inclined, a substantially straight elongated cutting blade rigidly mounted on the lower end of said lower end portion with said blade disposed at substantially right angles relative to said lower end portion and extending in a front to rear direction so as to be slightly forwardly and downwardly inclined relative to the upper portion of said operating shank disposed above said lower end portion, the forward end of said blade including a sharpened transverse cutting edge, the rear portion of said blade projecting rearwardly of said lower end portion and including means defining a rearwardly projecting abutment spaced rearwardly of said lower end portion, an elongated spring-type weed clamping blade closely spaced above and generally paralleling said cutting blade, said weed clamping blade including a forwardly and upwardly angled forward end portion and an upwardly offset rear end portion terminating rearwardly in a right angled terminal end overlying and rigidly secured to the front side of the lower end portion of said operating shank.

2. The combination of claim 1 wherein said cutting edge defines a forwardly opening notch including relatively angulated opposite side marginal portions defined by transverse sharpened edge segments of said cutting edge.

3. The combination of claim 2 wherein said lower end portion of said shank is angulated between 15° and 30° relative to the adjacent portion of said shank disposed thereabove.

4. The combination of claim 1 wherein said rearwardly outwardly projecting abutment comprises a rearwardly outwardly projecting rod portion having a generally horizontal cross head on its rear end.

* * * * *